UNITED STATES PATENT OFFICE.

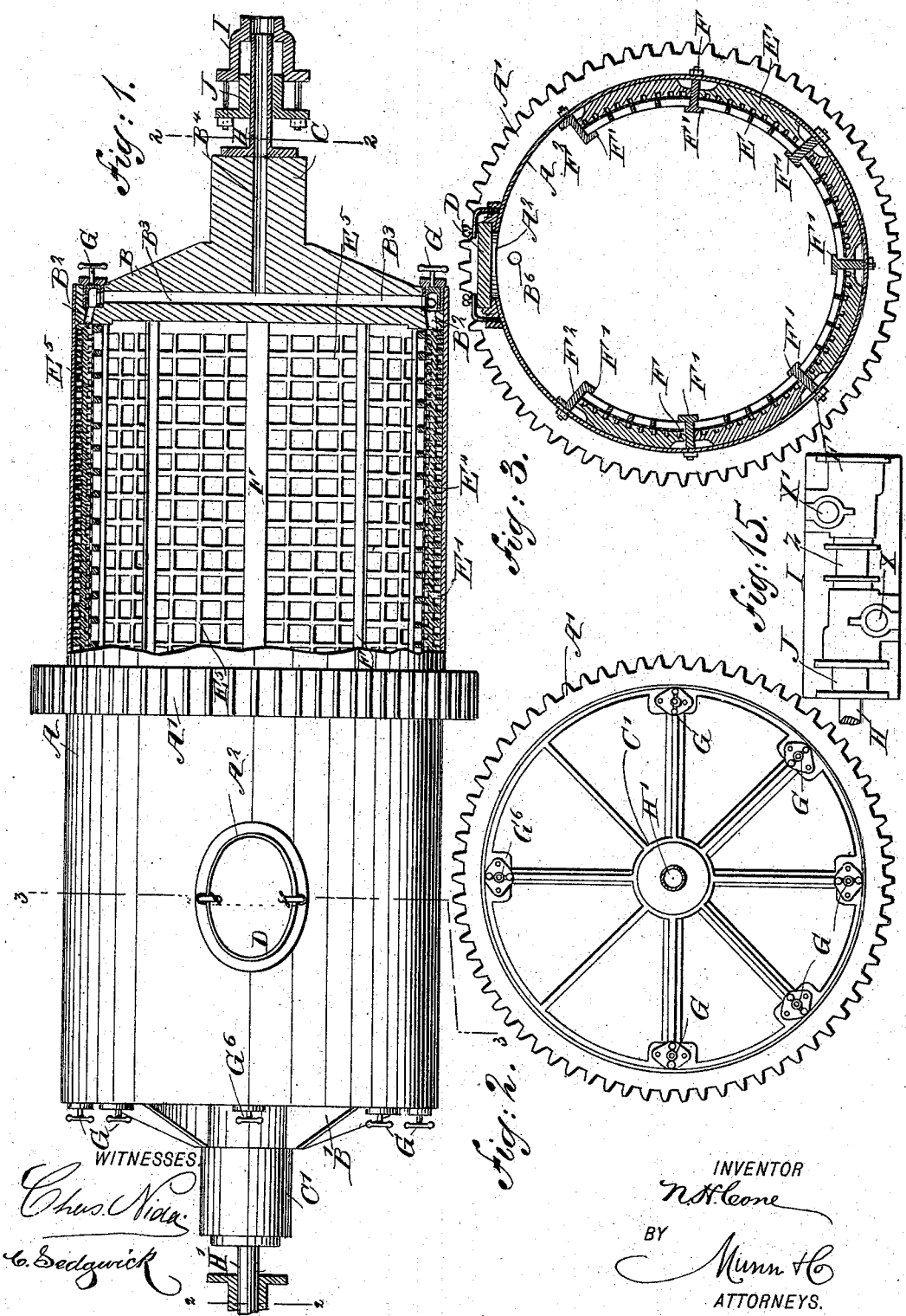

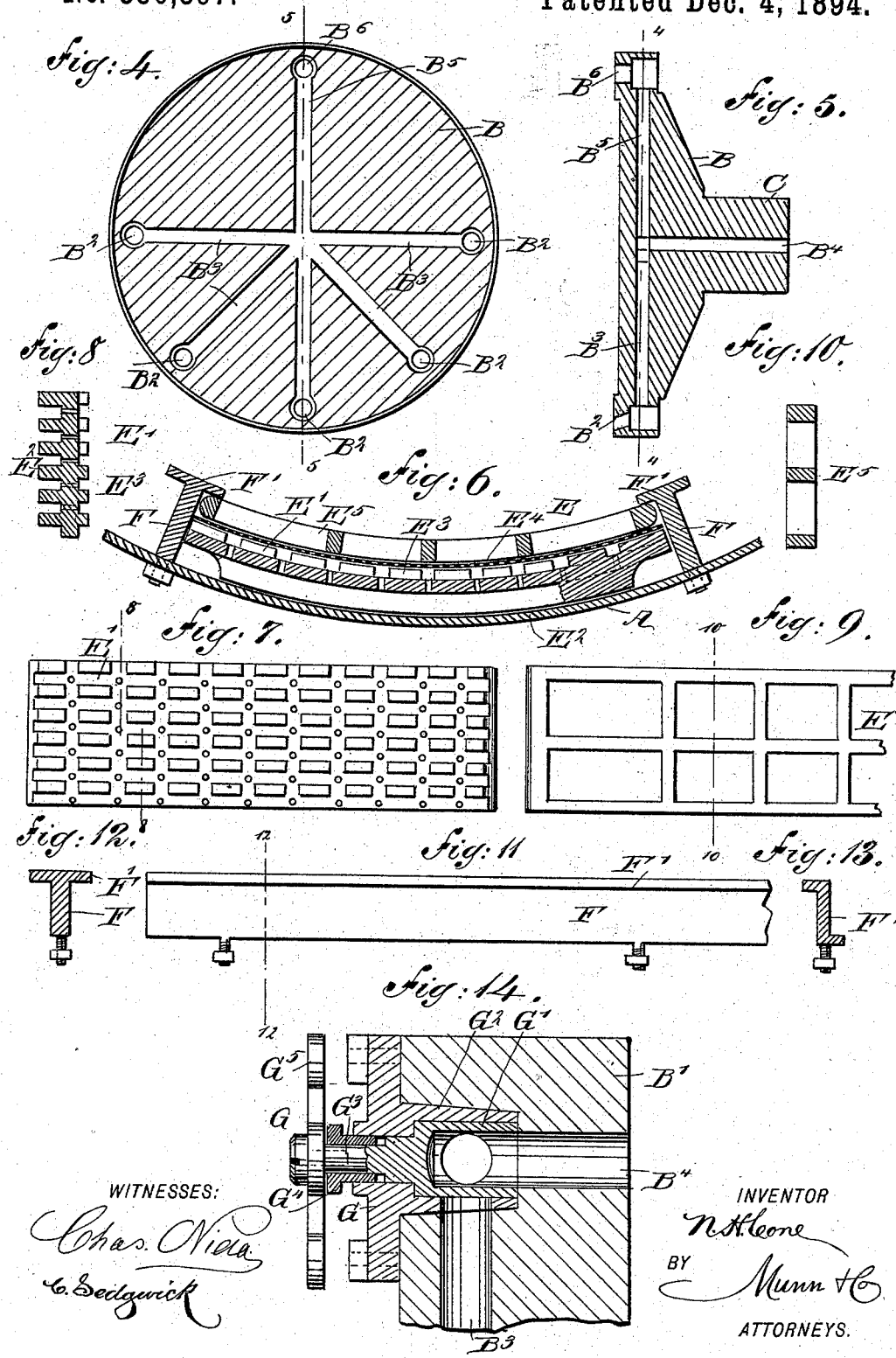

NORRIS H. CONE, OF LEADVILLE, COLORADO.

FILTER-BARREL.

SPECIFICATION forming part of Letters Patent No. 530,397, dated December 4, 1894.

Application filed October 19, 1893. Serial No. 488,600. (No model.)

*To all whom it may concern:*

Be it known that I, NORRIS H. CONE, of Leadville, in the county of Lake and State of Colorado, have invented a new and useful Improvement in Filter-Barrels, of which the following is a full, clear, and exact description.

The invention relates to apparatus used for treating any pulp composed of liquids and solids.

The object of the invention is to provide a new and improved filter barrel, which is simple and durable in construction, very effective in operation, and arranged to obtain the liquid from the solid matter in a very simple and economic manner.

The apparatus will be hereinafter fully described and the features of novelty specifically indicated.

Reference is to be had to the accompanying drawings, forming a part of this specification, in which similar letters of reference indicate corresponding parts in all the figures.

Figure 1 is a plan view of the improvement with parts in section. Fig. 2 is a cross section of the same on the line 2—2 of Fig. 1; it being practically an end view of filter. Fig. 3 is a cross section of the same on the line 3—3 of Fig. 1. Fig. 4 is a sectional face view of one of the cylinder heads on the line 4—4 of Fig. 5. Fig. 5 is a sectional side elevation of the same on the line 5—5 of Fig. 4. Fig. 6 is an enlarged cross section of part of the improvement, and showing the grates for holding the filtering cloth on the filtering bed as well as the means for securing a filtering bed to the cylindrical body of the filter. Fig. 7 is an enlarged plan view of one of the filter beds. Fig. 8 is a transverse section of the same on the line 8—8 in Fig. 7. Fig. 9 is an enlarged plan view of part of one of the filter grates. Fig. 10 is a transverse section of the same on the line 10—10 of Fig 9. Fig. 11 is an enlarged side elevation of part of one of the T irons for holding the filter grate, cloth and bed in place. Fig. 12 is a cross section of the same on the line 12—12 of Fig. 11. Fig. 13 is a similar view of one of the end T irons. Fig. 14 is an enlarged sectional side elevation of one of the valves in the cylinder heads; and Fig. 15 is an enlarged side elevation of the stationary box or journal at each end of the barrel or cylinder in which the journals or inlet and outlet pipes revolve.

The improved filter or filtering tank is provided with a cylinder A, of suitable material and dimensions and having the heads B and B', formed with hollow trunnions C and C', respectively, journaled in suitable bearings to permit of revolving the cylinder whenever necessary, for the purpose hereinafter more fully described.

The cylinder A is provided at or near the middle with an exterior gear wheel A' connected by suitable means with driving machinery to revolve the said cylinder.

The wall of the cylinder A is preferably formed with a charging opening $A^2$, for the introduction of the pulp as the latter comes from the batteries or other machinery, the said opening $A^2$ being adapted to be closed by a suitable lid or cover D, as shown in Figs. 1 and 3. As a means for holding the cover, D, closed when required, I may employ angular swing or turn bolts having clamping-screws in their free ends.

In the cylinder A is arranged a filter E, preferably made in segmental sections fitted on the inner surface of the cylinder, but leaving the opening $A^2$ free and unobstructed, as will be readily understood by reference to Fig. 3.

The several sections of the filter E are separated one from the other by longitudinally extending bars F, bolted or otherwise secured to the cylinder wall and extending from one cylinder head to the other. The inner ends of the bars F are formed with flanges F' engaging adjacent filter sections to hold the latter in place inside of the cylinder A. The end bars $F^2$ are preferably Z-shaped while the others are T irons as will be readily understood by reference to Figs. 3, 6, 11, 12 and 13. Each filter section is provided with a perforated segmental filter bed E' shown in detail in Figs. 7 and 8, and resting with its outer face $E^2$ on the inner surface of the cylinder wall. On the inner face $E^3$ of the bed E' is placed a filtering cloth $E^4$, held in place by a grating $E^5$ (see Figs. 3 and 6), the sides of which are engaged by the flanges F' of the bars F or $F^2$ as shown in Figs. 3 and 6. The faces $E^2$ and $E^3$ of the bed E' are grooved lengthwise and crosswise to form passages so as to permit the liquid, air or other fluid to pass the entire length of the filter section from one cylinder head to the other, and the bed E' is perforated at the grooves to permit the fluid to pass through the bed. The faces $E^2$ and $E^3$ are connected at their ends with ports $B^2$, formed in the cylinder heads B and B' and leading to radial channels $B^3$ terminating in the openings $B^4$, of the trunnions C and C'. See Figs. 1, 3 and 14. Each of the ports $B^2$ is adapted to be opened or closed to its respective channel $B^3$, by a valve G of any approved construction, such for instance as shown in detail in Fig. 14. The plug G' is mounted to turn in the valve body $G^2$ which is provided with a valve stem $G^3$, passing through a suitable stuffing box $G^4$, secured in the valve body $G^2$. The outer end of each stem $G^3$ is provided with a suitable handle $G^5$, for conveniently turning the plug G' to disconnect or connect the ports $B^2$ with the corresponding channel $B^3$. The opening $B^4$ or trunnion passage leading into each head B and B' connects with an additional channel $B^5$ (see Fig. 4) leading at its outer end into a port $B^6$ opening directly into the cylinder A at the space between the ends of the filter as will be readily understood by reference to Fig. 3. This channel $B^5$ is provided with a valve $G^6$ (Fig. 2) similar to the valves G and adapted to connect and disconnect the port $B^6$ and the channel $B^5$ in the respective head B or B'. The outer ends of the openings $B^4$ in the trunnions C, C', are connected with the pipes H and H' extending into the nipples I and I', respectively, shown in detail in Fig. 15, and connected with the supply tanks and air tanks, or the receiving tanks after the liquor has passed through the barrel and done its work. Each nipple is provided with a stuffing box J through which extends the pipe H or H', to render the connection between the nipples and pipes air and water tight.

Each nipple I or I' is connected at X X' with the liquor pipes leading to the supply or receiving pipes, so that there is one of each on each side of the machine.

The tube Z shown in Fig. 15, is a glass gage showing how clear the liquor is.

The operation is as follows: In case gold ores are to be treated, then the pulp from the batteries is caused to flow into the cylinder A at the opening $A^2$ standing at the top, as shown in Figs. 1 and 3. When the pulp has filled the barrel or cylinder, or has risen above the filtering surface or sections, the cover, D, is replaced and secured and the vacuum pump is started. It will be understood that at this time the valves $B^6$ are closed and the valves $B^2$ open. It is not absolutely necessary that the valves must be opened at both ends of the cylinder, since the same effect may be attained by opening such valves at one end only. Now to free the solid matter from the liquid, the valve $B^6$ (Fig. 4) is opened in one of the heads of the cylinder and air or other gas is introduced at that end, while all or a part of the valves at the other end of the cylinder are opened. By pressure of the gas, the liquid is driven out through those filter sections whose valves $B^2$ are open, and of course the liquid passes faster through those sections which are above the solid matter, or farthest from the bottom of the cylinder. When it is found any air or gas escapes from any filter section, the valve $B^2$ of such section is closed. In practice, the liquid escapes most rapidly through the two sections which are nearest the charging hole, $A^2$. If the filtration is impeded or stopped by reason of the filter cloth becoming clogged with solid matter, or the latter becoming packed to a considerable depth or thickness by pressure of the gas, the difficulty may be remedied by rotating the cylinder and introducing gas underneath the filter cloth and forcing it through the latter into the chamber of the cylinder; and since each filter section has a valve at each end of the cylinder, it will be seen that any particular filter-section may be thus freed from solid matter by proper manipulation of the valves. After the filtration has been accomplished, that is to say, when the water has been filtered off and separated from the solid matter, which is left comparatively dry, chlorine gas dissolved in water is introduced under pressure, and the cylinder revolved until the precious metal is in solution in the liquid. The latter is then withdrawn for further treatment (to obtain the metal).

The interior parts of the machine are plated with silver and lead, or either, to protect the same against the action of chlorine and sulphuric acid, or any other suitable plating may be employed, and I do not limit myself to any particular material of construction.

Having thus fully described my invention, I claim as new and desire to secure by Letters Patent—

1. An apparatus of the class described, provided with a revoluble cylinder having channeled heads, and ports leading therefrom into the interior of the cylinder, and a filter arranged in the said cylinder and made in sections each connected at one end with one of the said ports, substantially as shown and described.

2. An apparatus of the class described, provided with a revoluble cylinder having channeled heads, and ports leading therefrom into the interior of the cylinder, and a filter arranged in the said cylinder and made in sections each connected at one end with one of the said ports, and a valve for each of the said ports, to open or close the latter to its respective channel, substantially as shown and described.

3. The filter composed of a revoluble cylinder, a series of independent removable sections each comprising a filter bed, a filter cloth, and a grating placed upon said cloth for holding it in place on said bed, and a series of devices attached to the cylinder and arranged between adjacent filter sections and adapted for holding the latter in place on the inner surface of the cylinder, as shown and described.

4. In an apparatus of the class described, a filter made of independent sections divided by longitudinal bars, each section comprising a filter bed, a filter cloth and a grating for holding the cloth in place on the said bed, the said grating being held in place by flanges on the said bars, substantially as shown and described.

5. In a filter of the class described the cylindrical body and a filtering medium arranged within it, two like heads each having a hollow trunnion and also a series of channels radiating from said trunnion and leading into the spaces between the body of the filter and the filtering medium, and independent valves for controlling such channels as shown and described.

6. In an apparatus of the class described, the combination with a cylinder having channeled heads and ports leading from the channels to the interior of the cylinder near the periphery thereof, the said heads being also provided with recessed trunnions into which open the said channels, of a filter arranged within the said cylinder and made in sections, each comprising a segmental filter bed, a cloth on the inside thereof, a grating to hold the said cloth in place, and longitudinal bars attached to the cylinder and separating the filter sections and holding the same in place, substantially as shown and described.

7. In an apparatus of the class described, the combination with a revoluble cylinder having a hollow trunnion, and a head provided with radiating channels having independent valves, of a filter arranged in said cylinder and valves for opening or closing said channels independently of each other, as shown and described.

NORRIS H. CONE.

Witnesses:
F. L. RINDEBUSH,
JOHN S. CADY.